United States Patent [19]
Funahashi et al.

[11] Patent Number: 5,612,681
[45] Date of Patent: Mar. 18, 1997

[54] DATA TRANSMISSION SYSTEM HAVING DEDICATED CLOCK CHANNEL

[75] Inventors: Yasuhiro Funahashi; Kazunori Ikami; Osamu Nishimura; Yuji Kiyohara, all of Nagoya; Yoshihiko Hibino, Gifu-ken; Yuichi Yasutomo, Nagoya, all of Japan

[73] Assignee: Brother Kogyo Kabushiki Kaisha and Xing Inc., Aichi-ken, Japan

[21] Appl. No.: 277,744

[22] Filed: Jul. 20, 1994

[30] Foreign Application Priority Data

Jul. 21, 1993 [JP] Japan .................................. 5-180340

[51] Int. Cl.⁶ ...................................................... H04L 7/00
[52] U.S. Cl. .................... 340/825.21; 370/329; 370/503; 455/5.1; 340/825.5
[58] Field of Search ........................... 340/825.21, 825.2, 340/825.5; 375/356, 377; 370/85.1, 85.8, 100.1; 455/5.1

[56] References Cited

U.S. PATENT DOCUMENTS

| | | | |
|---|---|---|---|
| 4,031,543 | 6/1977 | Holz .......................................... | 455/5.1 |
| 4,156,847 | 5/1979 | Tazawa et al. ........................... | 455/5.1 |
| 4,225,939 | 9/1980 | Yashiro . | |
| 4,231,114 | 10/1980 | Dolikian ................................... | 375/356 |
| 4,340,961 | 7/1982 | Capel et al. ............................. | 370/85.8 |
| 4,343,042 | 8/1982 | Schrock et al. .......................... | 455/5.1 |
| 4,679,192 | 7/1987 | Vanbrabant ............................. | 370/85.1 |
| 4,860,006 | 8/1989 | Barall ...................................... | 340/825.5 |
| 4,988,989 | 1/1991 | Goto ........................................ | 340/825.21 |
| 4,989,203 | 1/1991 | Phinney .................................. | 340/825.5 |
| 5,025,500 | 6/1991 | Phinney .................................. | 340/825.5 |
| 5,263,163 | 11/1993 | Holt et al. ................................ | 340/825.5 |
| 5,376,928 | 12/1994 | Testin ...................................... | 340/825.5 |
| 5,434,984 | 7/1995 | Deloddere et al. ..................... | 340/825.5 |

FOREIGN PATENT DOCUMENTS 2246930 2/1992 United Kingdom .

OTHER PUBLICATIONS

IEEE Transactions on Communications, vol. COM–23, No. 1, Jan. 1975, pp. 104–107, K. Maeda 'Individualized Still–Picture Communication on a Two–Way Broad–Band CATV System'.

Primary Examiner—Michael Horabik
Assistant Examiner—Edward Merz
Attorney, Agent, or Firm—Oliff & Berridge

[57] ABSTRACT

The clock demodulator 25 continually demodulates the clock signal of the control CPU 7 transmitted from the clock modulator 10 of the center S. The terminal control CPU 23 performs processes such as transmission and reception of data with the demodulated clock signal as a reference clock. The time required to synchronize the clocks of the CPUs 7 and 23 is eliminated. Transmission and reception of data is executed quickly as soon as right of transmission is transferred to a terminal.

12 Claims, 3 Drawing Sheets

5,612,681

DATA TRANSMISSION SYSTEM HAVING DEDICATED CLOCK CHANNEL

BACKGROUND OF THE INVENTION

1. Field of the Invention

The present invention relates to a data transmission system wherein a center and a plurality of terminals are connected by a transmission line, the data transmission system being for performing bidirectionally transmission of data between the center and the terminals.

2. Description of the Related Art

As an example of this type of data transmission system, there has been known bidirectional cable television (CATV) system.

SUMMARY OF THE INVENTION

In the bidirectional CATV system, the clock in a terminal must be synchronized with the clock in the center before data can be transmitted or received. In order to synchronize the clock in the terminal with the clock in the center, it can be proposed that the following operations be performed in each terminal.

The right to transmit is transferred from one terminal to another. When a terminal receives from the center a signal requesting to connect circuits (polling signal), the terminal extracts the component of the connection request that corresponds to the clock of the center. The terminal demodulates the clock component into a reference clock signal that is synchronized with the clock of the center. Transmission of data to and reception of data from the center is then performed based on the reference clock.

However, in this type of data transmission system, transmission and reception of data can not be executed during the preamble, that is, from when a terminal receives a connection request until the clock component is demodulated into reference clock. This will increase the time required for transmission and reception of data. When the system includes a plurality of terminals, a preamble is required every time the right of transmission changes from terminal to terminal. Accordingly, in a data transmission system such as CATV system where there are a great many terminals, and where the center performs polling on each terminal in succession, the time consumed by these preambles will become an especially large problem, in some cases limiting the number of terminals that can be connected with one center.

It is therefore an objective of the present invention to provide a data transmission system capable of eliminating the preamble and of executing transmission and reception of data quickly.

In order to attain these and other objects, the present invention provides a data transmission system for bidirectionally transmitting data between a center and a plurality of terminals, the data transmission system comprising: a center and a plurality of terminals connected to the center by a transmission line, the center being for transmitting data to and receiving data from the plurality of terminals over the transmission line over at least one channel, and the center including clock transmission means for transmitting a clock signal over a predetermined channel that is different from the at least one channel over which data is transmitted to and from the center.

The clock transmission means preferably includes: clock pulse generating means for generating a clock pulse, based on which the center transmitting data to and receiving data from the plurality of terminals; and clock pulse modulating means for modulating the clock pulse into a clock signal of the predetermined channel. At least one of the plurality of terminals preferably includes: reference clock demodulation means for demodulating the clock signal from the center into a reference clock signal that is in synchronization with the clock pulse generated in the clock pulse generating means and for outputting the reference clock signal; and transmission/reception means for transmitting data to and receiving data from the center based on the reference clock signal.

According to another aspect, the present invention provides a data transmission device for transmitting data to and receiving data from a plurality of terminals connected to the data transmission device via a transmission line, the data transmission device comprising: clock transmission means for continuously transmitting a clock signal over a predetermined channel via a transmission line to a plurality of terminals; and data transmission/reception means for transmitting data to and receiving data from the plurality of terminals via the transmission line over at least one channel different from the predetermined channel.

According to a further aspect, the present invention provides a method of bidirectionally transmitting data between a center and a plurality of terminals connected to the center by a transmission line, the method comprising the steps of: continuously transmitting a clock signal from the center to at least one of the plurality of terminals over a predetermined channel; demodulating at the at least one of the plurality of terminals the clock signal from the center into a reference clock signal that is in synchronization with the clock signal from the center; performing transmission and reception of data, based on the reference clock signal, between the center and the at least one of the plurality of terminals over at least one channel that is different from the predetermined channel over which the clock signal is transmitted from the center.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENT

Figure 1:
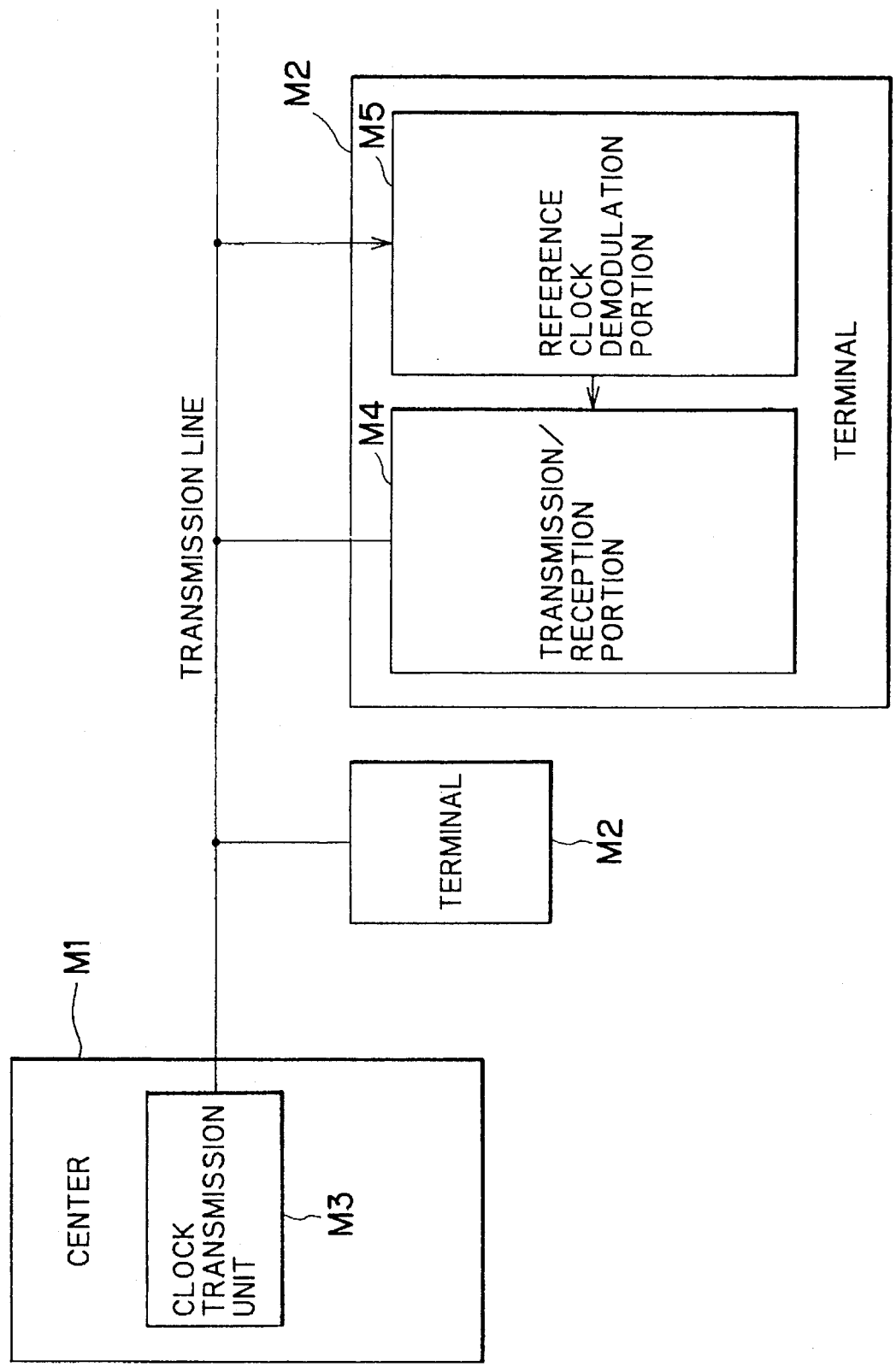
FIG. 1 is a block diagram showing structure of a data transmission system of a preferred embodiment of the present invention.

A data transmission system according to a preferred embodiment of the present invention will be described while referring to the accompanying drawings wherein like parts and components are designated by the same reference numerals to avoid duplicating description.

FIG. 1 shows a schematic representation of the data transmission system according to the preferred embodiment. The data transmission system is for bidirectionally transmitting data between a center M1 and a plurality of terminals M2. The center M1 is connected to the plurality of terminals M2 with a transmission line. The center M1 produces a clock pulse, based on which the center M1 performs transmission and reception of data with the terminals M2 via the transmission line over at least one channel C1. According to the present invention, the center M1 includes a clock transmission unit M3 for continuously transmitting a clock signal corresponding to the clock pulse, via the transmission line through a channel C2 different from the channel C1. At least one terminal of the plurality of terminals M2 includes a reference clock demodulation portion M5 for receiving the clock signal transmitted from the center M1 and demodulating the clock signal into a reference clock signal synchronized with the clock pulse. The at least one terminal M2 further includes a transmission/reception portion M4 connected to the reference clock demodulation portion M5 for performing transmission and reception of data with the center based on the reference clock signal.

According to the data transmission system having the above-described structure, the center M1 is controlled to perform data transmission and reception operation in accordance with the clock pulse generated therein. The clock transmission unit M3 modulates the clock pulse into the clock signals and continuously transmits the clock signal to the at least one terminal that has the transmission/reception portion M4 and the reference clock demodulation portion M5. The reference clock demodulation portion M5 demodulates the clock signal into a reference clock signal which is synchronized with the clock pulse. The transmission/reception portion M4 performs transmission and reception of data with the center, in accordance with the reference clock signal. Thus, the center M1 and the at least one terminals M2 are synchronously controlled to perform bidirectional transmission and reception of data therebetween.

Thus, the clock transmission unit M3 provided to the center M1 uses the predetermined channel C2 for transmitting a clock signal. The predetermined channel C2 for transmitting the clock signal is not used for transmitting data. The reference clock demodulation portion M5 provided to at least one terminal M2 continually demodulates the clock signal from the center and produces a reference clock signal that is synchronized with the center clock pulse. That is, the transmitted clock signal becomes a reference clock signal to be used in the terminal during the transmission and reception of data. The transmission/reception portion M4 can therefore transmit data to or receive data from the center based on the reference clock signal, as soon as the right of transmission has been transferred to the terminal. Accordingly, the preamble can be eliminated and transmission and reception of data can be quickly executed. For this reason, in a data transmission system wherein the center M1 performs polling in succession to each terminal M2, by applying the present invention a great many terminals can be connected to one center. Also, because the clock signal is transmitted over the predetermined channel C2 that is not used for transmission of data, the clock signal will not erroneously mix with other data.

Figure 2:
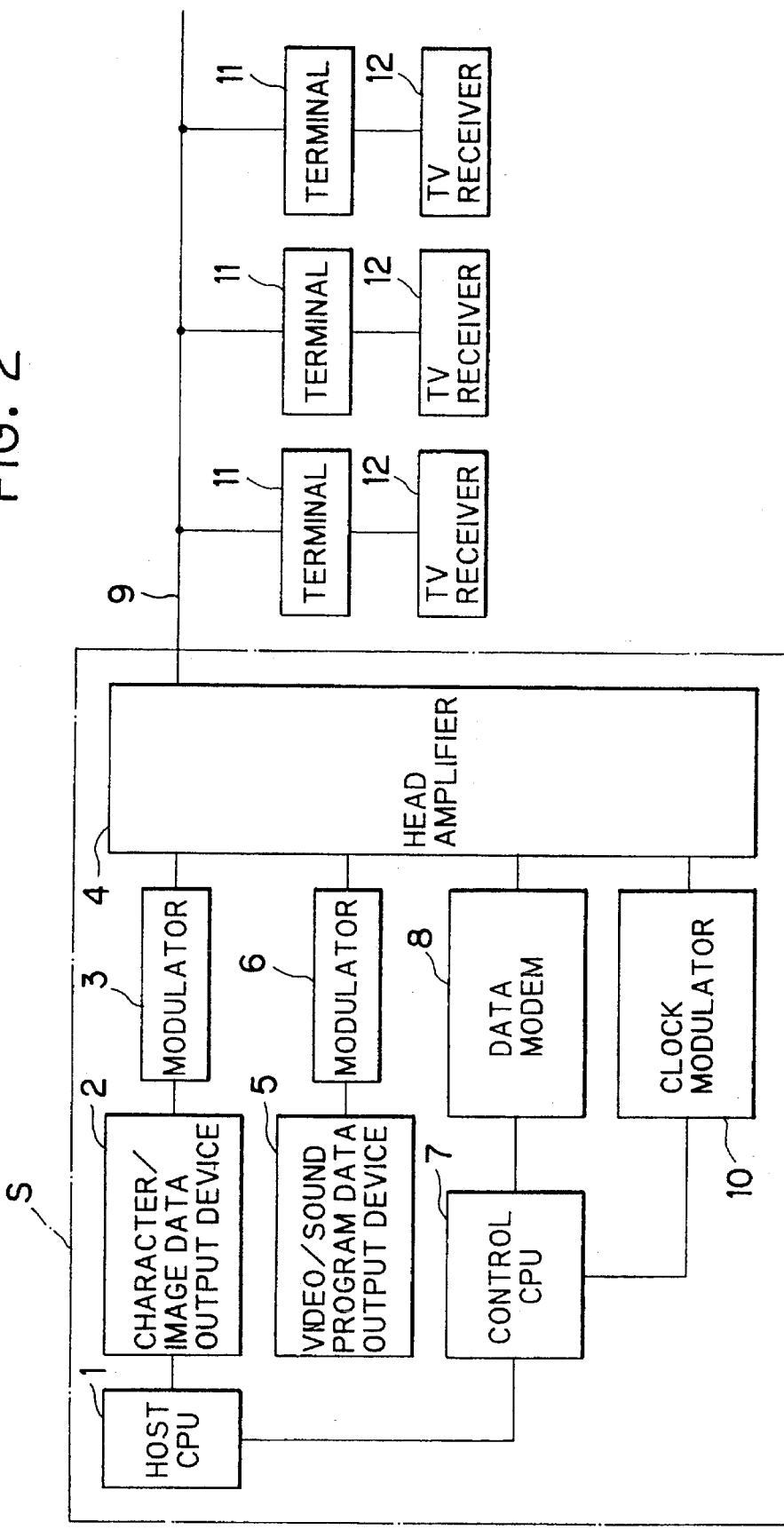
FIG. 2 is a block diagram showing overall configuration of a bidirectional CATV system according to one concrete example of the embodiment.

FIG. 2 is a block diagram showing overall construction of a concrete example of a bidirectional CATV system to which is applied the preferred embodiment of FIG. 1.

The CATV system includes a center S and a plurality of terminals 11. The center S is connected with the plurality of terminals 11 by a transmission line 9.

In the center S, a host CPU 1 is provided to perform overall control operation of the center S.

A character/image data output device 2 is connected to the host CPU 1. The device 2 is controlled by the host CPU 1 to output both character data representing images of alphanumeric characters such as written messages and advertisements and image data representing images of still pictures. Examples of the character data may include lyric data for karaoke songs, for being projected on television receivers 12 connected to the terminals 11 during karaoke performances achieved at the terminals 11. Examples of the image data may include image data of a composite image where a song title of each karaoke song is superimposed on a corresponding background still picture image, for being projected on the television receivers 12 at the start of the karaoke performance achieved at the terminals 11. (The character data and/or the image data will be referred to as "character/image data," hereinafter.)

A modulator 3 is provided for modulating the character/image data outputted from the character/image data output device 2 into character/image signals (alternating current signals) of at least one channel (frequency band) Ca. The modulator 3 is connected to a head amplifier (which is also called a "mixer/frequency divider") 4. The modulator 3 outputs the modulated signals to the head amplifier 4.

A video/sound program output device 5 is provided for preparing video/sound programs which are to be provided by this CATV system to users of the system. The device 5 outputs video/sound signals representing various video/sound programs. Examples for the device 5 may include a broadcast satellite reception system for outputting broadcast satellite signals (image signals and sound signals) and a video player for outputting video signals.

A modulator 6 is connected to the device 5 to receive the video/sound signals outputted therefrom. The modulator 6 modulates the video/sound signals into alternating current signals of at least one channel Cb (frequency band) which is different from the channel Ca. The modulator 6 is also connected to the head amplifier 4. The modulator 6 outputs the modulated video/sound signals to the head amplifier 4 connected thereto.

It is noted that the host CPU 1 also serves to produce various data to be transmitted to the terminals. More specifically, the host CPU 1 produces various control data. Examples of the control data may include polling data to be used for polling operation of the terminals 11, tuner control data used for tuner channel selection control operation for tuners 16 of the terminals 11, and various program data. The host CPU 1 also produces various image data and various sound data. For example, the host CPU 1 produces instrumental or vocal accompaniment sound data, for being played by sound sources (not shown) in the terminals 11 during karaoke performances achieved at the terminals 11.

A control CPU 7 is connected to the host CPU 1. The control CPU 7 is controlled by the host CPU 1 to perform overall control of data transmission/reception operation of the center S. The control CPU 7 continually generates clock pulses. The control CPU 7 is controlled by the host CPU 1 to perform its data transmission and reception operation, at timings based on the clock pulses.

More specifically, a data modem 8 is connected to the control CPU 7. The control CPU 7 transfers the various data outputted from the host CPU 1 to the data modem 8. The control CPU 7 controls the data modem 8 to modulate the received various data into data (alternating current signals) of at least one channel Cc (frequency band) different from the channels Ca and Cb and to output the modulated data to the head amplifier 4. It is noted that the control CPU 7 controls the data modem 8 to modulate and output the data, at timings determined dependently on the clock pulses. The control CPU 7 also controls the data modem 8 to receive and demodulate various data, such as request data, transmitted from the terminals 11 via the head amplifier 4. It is also noted that the control CPU 7 controls the data modem 8 to receive and demodulate the transmitted data, at timings determined dependently on the clock pulses. The demodulated data are supplied via the control CPU 7 to the host CPU 1.

According to the present invention, a clock modulator 10 is also connected to the control CPU 7. The clock modulator 10 continually receives the clock pulses generated from the control CPU 7 and modulates them into clock signals (alternating current signals) of one channel Cd (frequency band) different from any of the channels Ca, Cb and Cc. The clock modulator 10 outputs the clock signals to the head amplifier 4.

The head amplifier 4 is connected to the modulators 3 and 6, the data modem 8 and the clock modulator 10 for receiving input of the variety of signals outputted therefrom. The head amplifier 4 mixes the inputted signals, and transmits the mixed signals as outgoing signals over the transmission line 9 to an appropriate terminal of the plurality of terminals 11.

More specifically, the head amplifier 4 multiplexes the character/image signals (from device 2), the video/sound signals (from device 5), the various data (from CPU 1) and the clock signals (from device 10) which have been modulated into the different channels Ca - Cd. Then, the head amplifier 4 outputs the multiplexed signals to the transmission line 9. Thus, the clock signals, modulated by the clock modulator 10, are transmitted over the channel Cd that is different from the channels over which the signals from the data modem 8 or the modulators 3 and 6 are transmitted. Accordingly, it is possible to continuously transmit the clock signals to the terminals 11.

Each of the plurality of terminals 11 is connected to a television receiver 12. The terminals 11 receive the outgoing signals (character/image signals, video/sound signals, various data and clock signals) from the head amplifier 4 and drives the television receivers 12 in accordance with the received outgoing signals.

Figure 3:
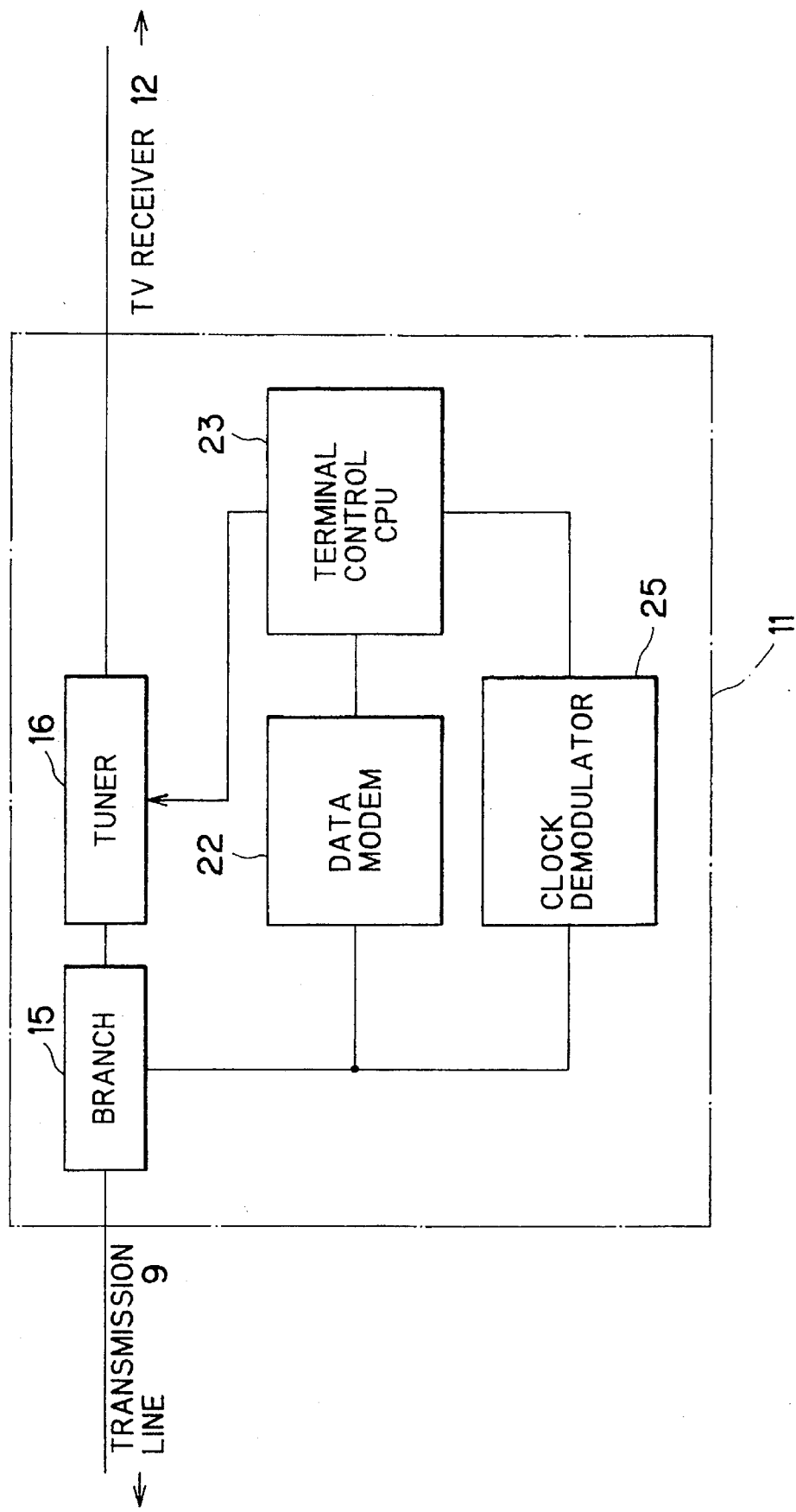
FIG. 3 is a block diagram showing configuration of a terminal of the CATV system of FIG. 2.

FIG. 3 is a block diagram showing the configuration of components in each terminal 11. As shown in FIG. 3, each terminal 11 includes a branch 15 into which the outgoing signals transmitted over the transmission line 9 are inputted. The branch 15 is connected by three separate lines to a tuner 16, a data modem 22, and a clock demodulator 25. The branch 15 therefore diverges signals from the center S to the three lines. More specifically, the branch 15 diverges the character/image signals and the video/sound signals to the tuner 16, diverges the various data from the host CPU 1 to the data modem 22, and diverges the clock signals to the clock demodulator 25.

The clock demodulator 25 continually demodulates the clock signals into reference clock signals that are in synchronization with the clock pulses generated at the control CPU 7 in the center S. The clock demodulator 25 outputs the reference clock signals to a terminal control CPU 23.

The terminal control CPU 23 performs data transmission and data reception control operation of the terminal 11, at timings based on the reference clock signals. Accordingly, the terminal control CPU 23 can perform data transmission and reception operation, at timings synchronized with the clock pulses of the control CPU 7.

More specifically, the data modem 22 is connected to the terminal control CPU 23. The terminal control CPU 23 controls the data modem 22 to receive and demodulate various data transmitted from the host CPU 1 of the center S, at timings of the reference clock signals. The terminal control CPU 23 also controls the data modem 22 to modulate and transmit various types of data, such as request data, to the center S at timings of the reference clock signals. It is noted that the clock signals are continuously transmitted to the terminal 11 over the predetermined channel Cd different from the channels Ca - Cc over which other various signals are transmitted. Accordingly, the terminal control CPU 23 can always perform the data transmission and reception operation.

The terminal CPU 23 processes the various data transmitted from the host CPU 1 of the center S. For example, if the received data is the tuner control data, the terminal CPU 23 controls the tuner 16 to select a desired channel. If the received data is the accompaniment sound data, the CPU 23 controls the sound source (not shown) to play a desired karaoke accompaniment sound.

The CPU 23 also performs to generate various data to be transmitted to the center S, such as request data requesting transmission of desired data. The data modem 22 modulates the data outputted from the CPU 23 and transmits them to the center S.

The tuner 16 receives the character/image signals and the video/sound signals supplied from the center S. The terminal control CPU 23 controls the tuner 16 in accordance with the received tuner control data. As a result, the tuner 16 selects a desired one of the channels Ca and Cb to supply a desired one of the character/image signals and the video/sound signals to the television receiver 12.

The CATV system having the above structure operates, as will be described below.

The control CPU 7 continuously generates clock pulses, and the clock modulator 10 continuously modulates the clock pulses into clock signals of the channel Cd. The head amplifier 4 transmits the clock signals via the transmission line 9 to each of the plurality of terminals 11. In each terminal 11, the branch 15 diverges the clock signals to the clock demodulator 25, which continuously demodulates the clock signals into the reference clock signals and outputs them to the terminal control CPU 23. The reference clock signals are in synchronization with the clock pulses of the control CPU 7.

The host CPU 1 performs polling to all the terminals 11 in succession, to thereby operationally connect the transmission line between the center S and the respective terminals 11. More specifically, the host CPU 1 generates polling data one by one for all the terminals 11. The polling data outputted from the host CPU 1 are supplied to the control CPU 7. The control CPU 7 controls to transmit the polling data from the host CPU 1 to the terminals 11, at timings determined dependently on the clock pulses generated in the CPU 7. More specifically, the control CPU 7 controls the data modem 8 to modulate the polling data into data of the channel Cc and to output the polling data toward the transmission line 9, at timings determined dependently on the clock pulses.

In each terminal, the branch 15 diverges the received corresponding polling data to the data modem 22. It is noted that the terminal control CPU 23 always being supplied with the reference clock signals can always perform its data transmission/reception operation at timings determined dependently on the reference clock signals. Accordingly, the terminal control CPU 23 controls the data modem 22 to demodulate the polling data transmitted from the center S, at timings of the reference clock signals.

If the terminal 11 does not require transmission of any data from the center S, the terminal control CPU 23 generates a request data indicating that the terminal 11 has made no request. On the other hand, if the terminal 11 requires transmission of data (character/image data, video/sound data or other various data) from the center S, the terminal control CPU 23 generates a request data indicating that the terminal has made a request and including the content of the request.

The terminal control CPU 23 controls the data modem 22 to modulate the request data and to transmit the modulated request data to the transmission line 9 via the branch 15, at timings of the reference clock signals. In the center S, the modulated request data received at the head amplifier 4 are supplied to the data modem 8, where the request data are demodulated and supplied via the control CPU 7 to the host CPU 1, at timings of the clock pulses.

If the request data requests transmission of the character/image data, the host CPU 1 controls the character image output device 2 to output the character/image data. The CPU 1 also produces tuner control data for controlling the tuner 16 of the terminal 11 to select the channel Ca for receiving the character/image data. On the other hand, if the request data requests transmission of the video/sound program data, the CPU 1 produces tuner control data for controlling the tuner 16 of the terminal 11 to select the channel Cb for receiving the video/sound program data. On the other hand, if the request data requests transmission of other various data, for example, instrumental or vocal accompaniment sound data for karaoke performance, the host CPU 1 produces the requested data.

Data outputted from the character/image data output device 2 or the video/sound program output device 5 are modulated for transmission to the channel Ca or Cb, at the modulator 3 or 6.

Data outputted from the host CPU 1 are supplied to the control CPU 7. The control CPU 7 controls to transmit the data from the host CPU 1 to the terminal 11 which has made the request, at timings determined dependently on the clock pulses generated in the CPU 7. More specifically, the control CPU 7 controls the data modem 8 to modulate the data into data of the channel Cc and to output the data toward the transmission line 9, at timings determined dependently on the clock pulses.

Thus modulated signals from the modulator 3 or 6 and from the modem 8 are mixed with the modulated clock signals (channel Cd) in the head amplifier 4 and transmitted to the terminal 11 that has made the request.

The terminal 11 receives the incoming mixed signals from the center S at the branch 15. The branch 15 divides the mixed signals into the character/image signals or the video/sound program signals, the various data from the host CPU and the clock signals. The character/image signals or the video/sound program signals are supplied to the tuner 16. The terminal control CPU 23 performs its data transmission/reception operation at timings determined dependently on the reference clock signals. More specifically, the terminal control CPU 23 controls the data modem 22 to demodulate the data transmitted from the host CPU 1 and to supply the demodulated data into the control CPU 23, at timings of the reference clock signals. Accordingly, the terminal control CPU 23 can properly receive the various data transmitted from the host CPU 1 of the center S at timings of the clock pulses. For example, if the data is the tuner control data, the terminal control CPU 23 controls the tuner 16 to select the channel Ca or Cb so as to supply the requested character/image or video/sound program to the television receiver 12.

If the data supplied to the control CPU 23 is the accompaniment sound data for the karaoke performance, the control CPU 23 controls the sound source (not shown) to output the accompaniment sound.

As described above, because the center is continually transmitting, and the terminal is constantly demodulating, clock signals, no time is required for synchronizing the clocks of CPUs 7 and 23. That is, the time consumed during the preamble is eliminated. Transmission and reception of data can be quickly executed as soon as the right of transmission is transferred to the corresponding terminal 11, i.e., as soon as the corresponding terminal 11 receives the polling signal. Accordingly, in the present invention, one center S can be connected to a great number of terminal 11.

Additionally, because the clock signal is transmitted via a predetermined channel Cd that is not used for transmitting data, the clock signal can be prevented from erroneously mixing with other data.

While the invention has been described in detail with reference to a specific embodiment thereof, it would be apparent to those skilled in the art that various changes and modifications may be made therein without departing from the spirit of the invention.

For example, in the above-described embodiment, the clock demodulator 25 is provided to each of the plurality of terminals 11. However, the clock demodulator 25 can be provided to only one or more terminals 11. The other terminals 11 can be synchronized, according to a clock component included in a connection request (polling signal) sent from the center S for data transmission and reception. In this case, the preamble can be eliminated when dealing with terminals provided with the clock demodulator 25. In this way, transmission and reception of data can be quickly executed in terms of the overall device.

Further, in the above-described embodiment, the present invention is applied to a bidirectional CATV device. However, the present invention can be applied to other types of data transmission devices.

What is claimed is:

1. A data transmission system for bidirectionally transmitting data between a center and a plurality of terminals, the data transmission system comprising:

a center and a plurality of terminals connected to the center by a single transmission line, the center transmitting data to and receiving data from the plurality of terminals over the transmission line over at least one channel, and the center including clock transmission means for continuously transmitting a clock signal over a predetermined channel that is different from the at least one channel over which data is transmitted to and from the center, at least one of the plurality of terminals receiving data from and transmitting data without a preamble to the center based on the clock signal transmitted from the center.

2. A data transmission system as claimed in claim 1, wherein the clock transmission means includes:

clock pulse generating means for generating a clock pulse, based on which the center transmits data to and receives data from the plurality of terminals; and clock pulse modulating means for modulating the clock pulse into the clock signal of the predetermined channel, wherein at least one of the plurality of terminals includes:

reference clock demodulation means for demodulating the clock signal from the center into a reference clock signal that is in synchronization with the clock pulse generated in the clock pulse generating means and for outputting the reference clock signal; and transmission/reception means for transmitting data to and receiving data from the center based on the reference clock signal.

3. A data transmission system as claimed in claim 2, wherein each of the plurality of terminals includes the reference clock demodulation means and the transmission/reception means.

4. A data transmission system as claimed in claim 2, wherein the clock pulse generating means of the center includes a control CPU for generating and outputting the clock pulse, and wherein the clock pulse modulating means includes a clock modulator for modulating the clock pulse generated by the control CPU to produce the clock signal of the predetermined channel and for transmitting the clock signal to the at least one terminal.

5. A data transmission system as claimed in claim 4, wherein the control CPU transmits data to and receives data from the plurality of terminals, based on the clock pulse generated therein.

6. A data transmission system as claimed in claim 5, wherein the center further includes a data modem connected to the control CPU for receiving data from the control CPU and for receiving data from the plurality of terminals, the data modem being controlled by the control CPU, based on the clock pulse, to modulate the data from the control CPU into modulated data of a channel different from the predetermined channel and to transmit the modulated data to the at least one terminal and to demodulate the data from the plurality of terminals and supply the demodulated data to the control CPU.

7. A data transmission system as claimed in claim 6, wherein the reference clock demodulation means of the at least one terminal includes a clock demodulator for demodulating the clock signal from the center into the reference clock signal, and wherein the transmission/reception means of the at least one terminal includes:

a terminal control CPU for receiving the reference clock signal generated in the clock demodulator and for generating data; and a data modem connected to the terminal control CPU for receiving data from the terminal control CPU and for receiving data from the center, the data modem being controlled by the control CPU, based on the reference clock signal, to modulate the data from the terminal control CPU and transmit the modulated data to the center and to demodulate the data from the center and supply the demodulated data to the terminal control CPU.

8. A data transmission system as claimed in claim 7, wherein the center further includes a head amplifier for mixing the modulated data from the data modem with the clock signal into a mixed signal, and for outputting the mixed signal to the at least one terminal, and wherein the at least one terminal further includes a branch for dividing the mixed signal into the modulated data and the clock signal and for outputting the modulated data and the clock signal, the clock signal being outputted to the reference clock demodulation means, the modulated data being outputted to the data modem.

9. A data transmission system as claimed in claim 2, wherein the center further includes data transmission/reception means for transmitting data to and receiving data from the plurality of terminals, based on the clock pulse generated in the clock pulse generating means.

10. A data transmission system as claimed in claim 9, wherein the data transmission/reception means of the center includes a data modem for modulating data into a modulated data and transmitting the modulated data to the plurality of terminals based on the clock pulse and for receiving and demodulating data from the plurality of terminals based on the clock pulse.

11. A data transmission device for transmitting data to and receiving data from a plurality of terminals connected to the data transmission device via a transmission line, the data transmission device comprising:

clock transmission means for continuously transmitting a clock signal over a predetermined channel via a single transmission line to a plurality of terminals; and data transmission/reception means for transmitting data to and receiving data from the plurality of terminals without a preamble via the transmission line over at least one channel different from the predetermined channel based on the clock signal transmitted to the plurality of terminals.

12. A method of bidirectionally transmitting data between a center and a plurality of terminals connected to the center by a single transmission line, the method comprising the steps of:

continuously transmitting a clock signal from the center to at least one of the plurality of terminals over a predetermined channel;

demodulating at the at least one of the plurality of terminals the clock signal from the center into a reference clock signal that is in synchronization with the clock signal from the center;

performing transmission and reception of data without a preamble, based on the reference clock signal, between the center and the at least one of the plurality of terminals over at least one channel that is different from the predetermined channel over which the clock signal is transmitted from the center.

* * * * *